United States Patent [19]

Hori et al.

[11] Patent Number: 5,178,781
[45] Date of Patent: Jan. 12, 1993

[54] PROCESS FOR PRODUCING OVER-BASED SULFURIZED ALKALINE EARTH METAL PHENATE TYPE DETERGENT

[75] Inventors: Takashi Hori; Sanae Ueda, both of Saitama; Yoshihiro Kojima, Ibaragi; Masato Goto; Hitoshi Kumagai, both of Saitama, all of Japan

[73] Assignees: Cosmo Oil Co., Ltd.; Cosmo Research Institute, both of Tokyo, Japan

[21] Appl. No.: 541,858

[22] Filed: Jun. 21, 1990

[30] Foreign Application Priority Data

Jun. 23, 1989 [JP] Japan ................. 1-162377

[51] Int. Cl.$^5$ ................. C10M 125/10; C10M 125/00
[52] U.S. Cl. ........................ 252/18; 252/25; 252/42.7; 568/18
[58] Field of Search ............ 252/18, 42.7, 25

[56] References Cited

U.S. PATENT DOCUMENTS

| | | | |
|---|---|---|---|
| 3,801,507 | 4/1974 | Hendrickson et al. | 252/42.7 |
| 3,966,621 | 6/1976 | Watkins et al. | 252/42.7 |
| 4,123,371 | 10/1978 | Hori et al. | 252/42.7 |
| 4,518,807 | 5/1985 | Hori et al. | 568/716 |
| 4,608,184 | 8/1986 | Chang | 252/42.7 |
| 4,664,824 | 5/1987 | Chang et al. | 252/42.7 |
| 4,710,308 | 12/1987 | Stauffer | 252/42.7 |

FOREIGN PATENT DOCUMENTS 0300486 7/1988 European Pat. Off. .
2126602 8/1983 United Kingdom .

*Primary Examiner*—Ellen McAvoy
*Attorney, Agent, or Firm*—Sughrue, Mion, Zinn, Macpeak & Seas

[57] ABSTRACT

A process for producing an over-based sulfurized alkaline earth metal phenate type detergent, which comprises reacting a phenol and a dihydric alcohol with an alkaline earth metal reagent to carry out a metal addition reaction, and reacting sulfur therewith to carry out a sulfurization reaction, and then reacting carbon dioxide therewith to carry out a carbon dioxide treatment, characterized in that the metal addition reaction and the sulfurization reaction are carried out under pressure and closed conditions. The sulfurization reaction may be carried out simultaneously with the metal addition reaction, or, alternatively, with the carbon dioxide treatment after the metal addition reaction. Furthermore, the sulfurization reaction may be carried out between the metal addition reaction and the carbon dioxide treatment.

34 Claims, No Drawings

PROCESS FOR PRODUCING OVER-BASED SULFURIZED ALKALINE EARTH METAL PHENATE TYPE DETERGENT

FIELD OF THE INVENTION

This invention relates to an improved process for industrial-scale production of an over-based sulfurized alkaline earth metal phenate type detergent useful as an alkaline detergent for lubricating oil or fuel oil. For purposes of the description below, a sulfurized earth metal phenate type detergent is considered to be "over-based" when the alkaline earth metal reagents react in amounts greater than the theoretically predicted amount.

BACKGROUND OF THE INVENTION

Generally, basic phenates have a remarkable effect of neutralizing or dispersing acids such as oxy acids and sulfuric acid or sludge, lacquer and carbon to thereby prevent corrosion wear, ring groove clogging and piston ring sticking from occurring when such substances are used or found in lubricating oils for internal combustion engines.

In so far as typical conventional methods for introducing sulfur into phenates are concerned, two methods are generally known. One of them is a method wherein an alkylphenol is treated with sulfur chloride to form a sulfide which is then converted into a metal salt. The other is a method wherein sulfurization is carried out by using elemental sulfur during metal addition or after previously forming a metal salt (phenate). The present invention belongs to the latter sulfurization method.

Many past attempts have been made to produce over-based phenates by using the latter sulfurization method. For example, U.S. Pat. No. 2,680,096 discloses a method for producing basic sulfurized calcium phenate wherein starting materials comprising phenols, calcium base, sulfur and a dihydric alcohol are heated to carry out a sulfurization-metal addition reaction. Furthermore, over-based phenates containing alkaline earth metals in an amount of at least twice the theoretical amount of hydroxyl group of phenols have been obtained by a one-step reaction in recent years. For example, Hori and Hayashida (Japanese Patent 1,303,226) had found out that highly basic alkaline earth metal phenates can be unexpectedly produced by carrying out sulfurization and a metal addition reaction simultaneously in the presence of an excess of phenols and the treating the resulting product with carbon dioxide. Further, Hori, Ueda et al (JP-A-59-31724 (the term "JP-A" as used herein means an "unexamined published Japanese patent application")) had found out that when the above-mentioned reaction is carried out by adding water to the reaction system, the metal addition reaction proceeds smoothly, and the conversion of alkaline earth metal reagents into products can be kept at a high level and the distillation time and associated utility costs of production of the reaction products after the metal addition reaction can be greatly reduced even when the amount of the dihydric alcohol to be used is reduced.

However, the alkaline earth metal contents of the products obtained by these methods are at most 300% of theoretical amount. Further, there are disadvantages that when the alkaline earth metal contents of the products are increased, performance as lubricating oil additive or fuel oil additive is lowered, and, particularly, oil solubility and stability are lowered when these conventional products are added to engine oil.

The present inventors have conducted studies to solve these problems as associated with the prior art as mentioned above. The present inventors have found that when the metal addition reaction and sulfurization are carried out simultaneously under pressure and closed conditions that highly over-based alkaline earth metal phenates can be produced in comparison with the instance where metal addition and sulfurization are carried out under atmospheric or super-atmospheric pressure and open condition. Specifically, these unexpected results are observed in the reaction for carrying out simultaneously the metal addition to phenols and the sulfurization of the phenols by adding an alkaline earth metal reagent and sulfur to a phenol and reacting them as carried out under pressure and closed conditions.

Further, the present inventors have unexpectedly found that remarkably high-based alkaline earth metal phenates can be produced by carrying out metal addition under pressure and closed conditions and carrying out sulfurization and carbon dioxide treatment under pressure without deaeration in the reaction. This process comprises adding an alkaline earth metal reagent to a phenol, reacting them to carry out metal addition to the phenol and then adding sulfur thereto to simultaneously carry out sulfurization and carbon dioxide treatment. The present invention has been accomplished on the basis of these findings.

Water and hydrogen sulfide are formed with the progress of the reaction in the metal addition—sulfurization reaction by using the phenols, the dihydric alcohol elemental sulfur and the alkaline earth metal reagent. As described above, Hori and Ueda et al (JP-A-59-31724) have found that when said reaction is carried out by adding water to the reaction system, the metal addition reaction proceeds smoothly, the conversion of the alkaline earth metal reagents into the products can be kept at a high level and the distillation time and utility costs of the reaction products after the metal addition reaction can be greatly reduced even when the amount of the dihydric alcohol to be used is reduced and that these effects cannot be attained only by the presence of water formed in the course of the reaction.

According to conventional wisdom, it was considered proper and desirable to remove or vent hydrogen sulfide formed during the reaction out of the reaction vessel; i.e., use an open condition. Accordingly, the reaction of metal addition to the phenols by reacting phenols with alkaline earth metal reagents or the reaction for carrying out simultaneously the metal addition and sulfurization by reacting the phenols, the alkaline earth metal reagents and sulfur, has been conventionally carried out under atmospheric or super-atmospheric pressure and open conditions. Though the exact mechanism with which the sulfurization and metal addition reaction proceeds is not specifically understood beyond what is known as to the chemical structure of the product, it is an unexpected finding by the present inventors that when hydrogen sulfide or water formed during the reaction is confined within the reaction system i.e., use a closed condition that remarkably high-based alkaline earth metal phenates can be produced in comparison with the instance where said reaction is carried out under atmospheric or super-atmospheric pressure and open conditions. The resulting products of the present invention have excellent performance as a lubricating oil additive or a fuel oil additive and are particularly excellent in oil solubility and stability when added to engine oil.

SUMMARY OF THE INVENTION

An object of the present invention is to provide a process which is fundamentally different from conventional processes and enables over-based phenate type detergent having high acid-neutralizing ability and excellent in oil solubility, stability, inter alia, to be produced in a labor saving manner.

Accordingly, the present invention provides a process for producing an over-based sulfurized alkaline earth metal phenate type detergent wherein said process comprises reacting a phenol and a dihydric alcohol with an alkaline earth metal oxide or hydroxide (hereinafter referred to as alkaline earth metal reagent) to carry out the addition reaction of the metal to the phenol, and reacting sulfur therewith to carry out a sulfurization reaction, and then reacting carbon dioxide therewith to carry out a carbon dioxide treatment, characterized in that said metal addition reaction and said sulfurization reaction are carried out under pressure and closed conditions.

DETAILED DESCRIPTION OF THE INVENTION

In the practice of the present invention, the sulfurization reaction with addition of sulfur can be carried out either simultaneously with the metal addition reaction, or can be carried out simultaneously with the carbon dioxide treatment after the metal addition reaction without conducting deaeration. Furthermore, the sulfurization reaction can be carried out between the metal addition reaction and the carbon dioxide treatment.

In a preferred embodiment of the present invention, the metal addition reaction and the sulfurization reaction are carried out under pressure and closed conditions in the process in order to produce an over-based sulfurized alkaline earth metal phenate type detergent which comprises reacting a phenol, a dihydric alcohol, an alkaline earth metal reagent and sulfur to perform the metal addition and sulfurization simultaneously, and then carrying out the carbon dioxide treatment.

In another preferred embodiment of the present reaction, the metal addition reaction is carried out under pressure and closed conditions, and the sulfurization reaction and the carbon dioxide treatment are carried out under pressure without conducting deaeration in the process in order to produce an over-based sulfurized alkaline earth metal phenate type detergent which comprises reacting a phenol and a dihydric alcohol with an alkaline earth metal reagent to effect the metal addition to the phenol and then adding sulfur thereto to carry out simultaneously sulfurization and carbon dioxide treatment.

More specifically, the reaction for carrying out the metal addition to the phenol, or carrying out simultaneously the metal addition and sulfurization, is carried out in the presence of an excess of a phenol or another suitable diluent under pressure and closed conditions; then the reaction product is distilled to remove at least part of water formed or to remove at least part of unreacted dihydric alcohol and water formed; then the distillation residue is treated with sulfur and carbon dioxide or with carbon dioxide without conducting deaeration; and finally the mixture derived thereby is distilled to remove unreacted phenol and the remaining dihydric alcohol or to remove unreacted phenol, the remaining dihydric alcohol and a part of the diluent, thus obtaining the distillation residue as the desired product.

Phenols which can be used in the present invention include those having a hydrocarbon side chain of 4 to 36 carbon atoms, preferably 8 to 32 carbon atoms such as an alkyl group, an alkenyl group, an aralkyl group or the like. More specifically, examples of the phenols include those having a hydrocarbon group such as butyl, amyl, octyl, nonyl, dodecyl, cetyl, ethylhexyl or triacontyl group or a group derived from a petroleum hydrocarbon such as liquid paraffin, wax or a polyolefin polymer (e.g., polyethylene, polypropylene, polybutene or the like). These phenols may be used either alone or as a mixture of two or more of them. Phenols which are in a liquid state at about 120° C. or higher are preferred and at 130° C. or higher especially preferred.

Alkaline earth metal oxides or hydroxides can be used a the alkaline earth metal reagents. Examples thereof include calcium, barium, strontium and magnesium oxides or hydroxides. The amounts of the alkaline earth metal reagents to the phenols are widely varied. For example, the alkaline earth metal reagent is used in an amount of about 0.01 to 0.99 equivalents, preferably about 0.10 to 0.90 equivalents per one equivalent of the phenol. When the ratio of the alkaline earth metal reagent to the phenol is not higher than 0.01 by equivalent, the cost of recovering unreacted phenol is required in addition to poor yield of the product and hence such an amount is not preferred from an economical point of view. On the other hand, when the ratio exceeds about 0.99, the reactivity of the alkaline earth metal reagent is lowered and a large amount of insoluble matter is formed so that a problem is caused in removing such insoluble matter and the yield of the product is also lowered. Since the phenol is a monobasic acid, 1 gram equivalent is 1 mol while one mol of the alkaline earth metal reagent corresponds to 2 gram equivalents.

Dihydric alcohols which have a relatively low boiling point and a low viscosity and are highly reactive, are used. Particularly preferred examples of the dihydric alcohols include ethylene glycol and propylene glycol. The dihydric alcohol is used in an amount of about 0.15 to 6 mol, preferably about 1 to 4 mol per mol of the alkaline earth metal reagent. The dihydric alcohol facilitates the reaction of the phenol with the alkaline earth metal reagent to thereby convert them into a stable oil-soluble material. A part of the dihydric alcohol is incorporated into the produced phenate to form a polymerized phenate. When the amount of the dihydric alcohol to be used is too small, the reactivity of the alkaline earth metal reagent is lowered, while when the amount is too large, a long period of time is required to distill off an excess of the dihydric alcohol from the reaction product and therefore utility cost is excessive even though the addition reaction of the metal t the phenol proceeds smoothly.

If desired, water may be added to the reaction system in the course of the step of reacting the phenol with the alkaline earth metal reagent. Distilled water, condensed water discharged from a boiler, industrial water and water formed by the metal addition reaction all can be suitably used. The amount of water to be added is in the range of about 0.01 to 2.0 mol, preferably about 0.05 to 1.5 mol per mol of the alkaline earth metal reagent. When water is added, the metal addition reaction proceeds smoothly.

Sulfur can be used in the wide range of from a trace amount to a relatively large amount in the present invention. Sulfur is used in a amount of generally not more than about 4.0 mol, preferably about 0.001 to 3.0 mol per mol of the alkaline earth metal reagent. When the amount of sulfur is too large, there is a difficulty in obtaining basic phenate.

In the present invention, a diluent having an appropriate viscosity may be added to the reaction system to facilitate the handling of the reaction products, the intermediates or the desired products. For example, bottom products can be obtained in a desired liquid form when the recovery of the unreacted phenol from the reaction products by distillation after the metal addition reaction stage or the carbon dioxide treatment is carried out in the presence of a diluent having a high boiling point and an appropriate viscosity. Usually, a portion of the diluent is distilled off together with the unreacted phenol. Accordingly, it is preferred to use a diluent having no direct adverse effect on the reaction when the recovered phenol is repeatedly used for the reaction. If desired, the reaction may be carried out in the presence of the diluent. Preferred examples of the diluent include petroleum fractions having an appropriate viscosity such as paraffinic, naphthenic and aromatic base oils and mixtures thereof. In addition thereto, organic solvents which are hydrophobic or lipophilic can be used as diluents, so long as they do not have an adverse effect on the reaction or the products in use.

The principal manufacturing process and working conditions of the over-based sulfurized alkaline earth metal phenates of the present invention are as follows: (Pressure throughout the specification is to be construed as expressed in absolute pressure unless otherwise indicated).

In the metal addition reaction stage, a phenol, a dihydric alcohol and an alkaline earth metal reagent in an amount of about 0.01 to 0.99 gram equivalents, preferably about 0.10 to 0.90 gram equivalents per one gram equivalent of the phenol are used. If desired, sulfur is added thereto. The reaction is carried out at a reaction pressure of about 2 to 11 $kg/cm^2$, preferably about 2 to 6 $kg/cm^2$ under closed conditions. Sulfur may be added to this reaction stage, or to the carbon dioxide treatment stage subsequent to the metal addition reaction stage. The reaction temperature is about 60° to 200° C., preferably about 90° to 190° C. Usually, the reaction is completed in about 1 to 9 hours. Preferably at least about 30%, more preferably at least about 60% of water formed in the course of the reaction is distilled off after the reaction. When a large amount of water is left in the final product, the stability of the product is deteriorated. Further, when a large amount of water is present in the reaction system in the carbon dioxide treatment of the product after the above reaction, the reactivity of the alkaline earth metal reagent is lowered and there is a difficulty in obtaining the desired over-based sulfurized alkaline earth metal phenate.

It is possible that an over-based alkaline earth metal phenate is formed a the final product in the above-described metal addition reaction stage. However, it is necessary that the reaction product obtained in the above stage is subjected to the carbon dioxide treatment stage to further increase stability and oil solubility.

When the reaction product is treated with carbon dioxide in the carbon dioxide treatment stage, performance as lubricating oil additive or fuel oil additive can be further improved, and particularly solubility in engine oil and stability can be improved when added to engine oil such as described, for example, in U.S. Pat. No. 3,036,971. In the carbon dioxide treatment stage, the liquid distillation residue obtained after the completion of the metal addition reaction stage, or, the sulfurization and metal addition reaction stage, is put into an autoclave and reacted with carbon dioxide at a temperature of about 50° to 230° C., preferably about 80° to 200° C. under pressure without deaeration. When only metal addition is carried out in the above-described stage, sulfur is added and the product obtained after the metal addition reaction stage is reacted with sulfur and carbon dioxide under pressure without deaeration. The reaction pressure is 2 to 11 $kg/cm^2$, preferably 2 to 6 $kg/cm^2$. The reaction time is generally several minutes to ten-odd hours.

If desired, the above-described metal addition reaction ca be repeated by adding the alkaline earth metal reagent, wherein the ratio of the total amount of the alkaline earth metal reagent used to the total amount of the phenol used is not higher than about 0.99 by gram equivalent, and the dihydric alcohol to the reaction product after the carbon dioxide treatment has been performed, and then the carbon dioxide treatment is repeated at least once to effect further metal addition. It is preferred from an economical standpoint that a part or most of the unreacted phenol present in the reaction product after the carbon dioxide treatment is recovered. The recovered phenol can be used as the starting material. Any excess dihydric alcohol remaining after the metal addition reaction stage or the sulfurization-metal addition reaction stage is recovered together with the unreacted phenol before or after the carbon dioxide treatment. When the distillation of the unreacted phenol is carried out in the presence of a typical diluent such as a mineral oil having a high boiling point, the distillation residue can be obtained in a preferred form of a liquid. Small amounts of insoluble matters left in the distillation residue can be removed by filtration or centrifugal separation before or after the recovery of the phenol.

The thus-obtained reaction products are over-based sulfurized alkaline earth metal phenate type detergents wherein the amounts of the alkaline earth metal reagents reacted are larger than the theoretical amounts relative to the gram equivalents of the phenols reacted.

In the present invention, over-based sulfurized alkaline earth phenate type detergents or over-based sulfurized alkaline earth metal phenates are generally described as "phenates". However, the exact molecular structure thereof is not clear at the present time. The term "phenate" as used herein refers to not only a phenate in a chemical structure sense, but also phenate-type detergent products or materials generally defined by practitioners in the industry as a phenate.

According to the present invention, a process is carried out to provide over-based sulfurized alkaline earth metal phenate type detergents, wherein a large amount of an alkaline earth metal is reacted with a phenol, and the detergents can be produced in good yields with regard to the alkaline earth metal reagents used, yet, the process is relatively simple and a small number of starting materials are required. Particularly, the detergents obtained have a high basic number or basicity and a low viscosity and are excellent in oil solubility and stability.

The present invention is now illustrated in greater detail by reference to the following examples which, however, are not to be construed as limiting the invention in any way.

EXAMPLE 1

385.5 g (1.75 mol) of nonylphenol, 11.2 g (0.35 mol) of sulfur and 28.3 g (0.5 mol) of calcium oxide having a purity of 99.2% were charged into a 1 liter autoclave equipped with a stirrer, a gas introducing pipe and a thermometer, and then stirred. To the resulting suspension, there was added 62.1 g (1.0 mol) of ethylene glycol at 130° C. under pressure (pressurized to 2.0 kg/cm$^2$ with nitrogen). The mixture was stirred at 130° C. under a pressure of about 3.0 kg/cm$^2$ and closed conditions for about 3.0 hours. While pressure within the reaction system was gradually reduced, water formed, a part of unreacted ethylene glycol and a small amount of nonylphenol were distilled off to obtain 444.5 g of a dark green liquid distillation residue. The temperature of the final distillate was 100° C. (16 mmHg). Carbon dioxide was then allowed to be absorbed by 444.5 g of the distillation residue from the reduced pressure condition at a heating temperature of 150° C. for 30 minutes. The final pressure was 4.1 kg/cm$^2$. Thereafter, the reaction system was pressurized to 6.0 kg/cm$^2$ with carbon dioxide. While the pressure was maintained, the reaction system was retained at 185° C. for 2.0 hours without deaeration (namely when pressure was lowered, carbon dioxide was replenished, but evacuation was not carried out), whereby 463.1 g of a dark yellowish green reaction product solution was obtained.

378.6 g of the reaction product solution after the carbon dioxide treatment and 99.4 g of 150 neutral oil (paraffinic lubricating oil having a viscosity of 4.81 cSt at 100° C.) were enclosed in a 1 liter two-necked pear-shaped flask. A small amount of ethylene glycol, most of unreacted nonylphenol and a small amount of the lubricating oil fraction were distilled off therefrom under reduced pressure to obtain 189.9 g of a distillation residue. The temperature of the final distillate was 195° C. (3 mmHg). The distillation residue was filtered to remove a very small amount of insoluble matter, whereby 187.6 g of the final product was obtained which was a dense dark yellow clear liquid. The analysis showed that active nonylphenol component accounted for 58.7 g of the total weight (187.6 g) of the final product.

The properties (including equivalent ratio of metal addition (a ratio by equivalent of the alkaline earth metal reagent which was converted into the basic alkaline earth metal phenate by the reaction and the phenol)) of the final product containing the desired over-based sulfurized alkaline earth metal phenate as active component are summarized in Table 1. The equivalent ratio of metal addition of the product is calculated from the material balance of the starting materials. The viscosity, basic number (according to JIS-K2600), calcium content and sulfur content of the final products are the observed values.

COMPARATIVE EXAMPLE 1

The procedure of Example 1 was repeated except that the reaction in the sulfurization-metal addition stage was carried out under a pressure of 3.0 kg/cm$^2$ and open conditions to prepare a basic sulfurized alkaline earth metal phenate. After the sulfurization-metal addition reaction, water formed and part of unreacted ethylene glycol were distilled off to obtain 441.2 g of a liquid distillation residue. The temperature of the final distillate was 98° C. (19 mmHg). After the distillation residue was treated with carbon dioxide, the reaction product solution weighed 464.4 g. Ethylene glycol and most of unreacted nonylphenol were distilled off from 368.1 g of said reaction product solution and 5.6 g of 150 neutral oil to obtain 203.8 g of a distillation residue. The temperature of the final distillate was 182° C. (5 mmHg). The yield of the final product was 199.4 g, and the final product contained 8.4 g of the active nonylphenol component. The properties of the final product are shown in Table 1.

Example 1 shows an embodiment wherein the reaction in the sulfurization-metal addition stage was carried out under pressure and closed conditions. It is apparent from Table 1 that the over-based sulfurized alkaline earth metal phenate having a high equivalent ratio of metal addition is obtained in Example 1. In Comparative Example 1, the reaction in the sulfurization-metal addition stage is not carried out under pressure and closed conditions and hence the equivalent ratio of metal addition is low. When the results of Example 1 are compared with those of Comparative Example 1, the equivalent ratio of metal addition of Example 1 increases by 20%.

TABLE 1

|  | Ex. 1 | Comp. Ex. 1 |
| --- | --- | --- |
| Properties of final product: |  |  |
| Viscosity cSt (@ 100° C.) | 160.7 | 106.0 |
| Basic number mg KOH/g | 238 | 214 |
| Ca content wt % | 8.53 | 7.83 |
| S content wt % | 3.48 | 3.45 |
| Equivalent ratio of metal addition | 3.0 | 2.5 |
| Solubility*[1] | soluble | — |
| Stability to moisture absorption*[2] hr | at least 48 | — |

Solubility*[1]: Solubility in Middle Eastern paraffinic 50 engine oil at 60° C. with stirring for 5 minutes.
Stability to moisture absorption*[2]: Time taken until a film is formed on the surface of an oil having a basic number of 77 mg KOH/g prepared from Middle Eastern paraffinic 50 engine oil at a humidity of 98% and a temperature of 28° C.

In the following Tables, solubility and stability to moisture absorption are evaluated in the same manner as that described above.

EXAMPLE 2

The same experimental apparatus as that of Example 1 was used. 660.9 g (3.0 mol) of nonylphenol, 5.8 g (0.18 mol) of sulfur and 16.9 g (0.3 mol) of calcium oxide having a purity of 99.4% were charged into the apparatus and stirred under atmospheric pressure. To the resulting suspension, there was added 63.3 g (1.0 mol) of ethylene glycol at 130° C. under nitrogen pressure. The mixture was stirred at 130° C. under a pressure of 6.0 kg/cm$^2$ and closed conditions for 3 hours. While pressure within the reaction system was gradually reduced, water formed and part of unreacted ethylene glycol were distilled off to obtain 710.3 g of a distillation residue which was a dark yellowish green liquid. The temperature of the final distillate was 100° C. (18 mmHg).

Subsequently, 706.3 g of said distillation residue was transferred to another autoclave. Pressure within the autoclave was reduced, and carbon dioxide was allowed to be absorbed by the distillation residue at a heating temperature of 120° C. from said reduced pressure condition for 30 minutes. The final pressure was 4.7 kg/cm$^2$. Thereafter, the reaction system was pressurized to 6.0 kg/cm$^2$ with carbon dioxide. While the pressure was maintained, the reaction system was retained at 155° C. for 2 hours without deaeration, whereby 719.1 g of a reaction product solution was obtained.

620.3 g of the reaction product solution after the above carbon dioxide treatment and 55.2 g of 150 neutral oil were put into a 1 liter two-necked pear shaped flask. A small amount of ethylene glycol, the greater part of unreacted nonylphenol and a small amount of the lubricating oil fraction were distilled off therefrom in a nitrogen stream under reduced pressure to obtain 115.1 g of a distillation residue. The temperature of the final distillate was 176° C. (4 mmHg). The distillation residue was filtered to remove very small amounts of insoluble matters, whereby 114.5 g of the final product was obtained which was a dense dark yellow clear liquid. The analysis showed that the active nonylphenol component accounted for 34.4 g of the total weight (114.5 g) of the final product. The properties of the final product are shown in Table 2.

COMPARATIVE EXAMPLE 2

The procedure of Example 2 was repeated except that the reaction in the sulfurization-metal addition stage was carried out under atmospheric pressure and open conditions for about 5 hours and the amount of 150 neutral oil was increased to prepare a basic sulfurized alkaline earth metal phenate. The starting materials used were 660.9 g (3.0 mol) of nonylphenol, 5.8 g (0.18 mol) of sulfur, 17.1 g (0.3 mol) of calcium oxide having a purity of 98.3% and 63.3 g (1.0 mol) of ethylene glycol. While pressure within the reaction system was gradually reduced after the completion of the metal addition-sulfurization reaction, water formed and part of unreacted ethylene glycol were distilled off to obtain 683.8 g of a distillation residue which was a dark yellowish green liquid. The temperature of the final distillate was 87° C. (6 mmHg). Subsequently, 678.3 g of the distillation residue was transferred to other autoclave. Pressure within the autoclave was reduced. Carbon dioxide was allowed to be absorbed by the distillation residue at a heating temperature of 120° C. from said reduced pressure condition for 30 minutes. The final pressure was 4.9 kg/cm$^2$. Thereafter, the reaction system was pressurized to 6.0 kg/cm$^2$ with carbon dioxide. While the pressure was maintained, the reaction system was retained at 155° C. for 2 hours without deaeration to obtain 690.8 g of a reaction product solution. 71.6 g of 150 neutral oil was added to 684.8 g of the reaction product solution after the carbon dioxide treatment. Ethylene glycol, the greater part of unreacted nonylphenol and a small amount of the lubricating oil fraction were distilled off therefrom to obtain 140.4 g of a distillation residue. The temperature of the final distillate was 167° C. (3 mmHg). The yield of the final product was 140.0 g, and the final product contained 46.2 g of the active nonyl phenol component. The properties of the final product are shown in Table 2.

It is apparent from Table 2 that when the result of Example 2 is compared with that of Comparative Example 2, the equivalent ratio of metal addition increases by about 18%. Example 2 is an embodiment wherein the reaction is carried out by allowing the alkaline earth metal reagent to be present in an amount much greater than that of nonylphenol in comparison with Example 1.

TABLE 2

|  | Ex. 2 | Comp. Ex. 2 |
| --- | --- | --- |
| Properties of final product: | | |
| Viscosity cSt (@ 100° C.) | 348.8 | 318.7 |
| Basic number mg KOH/g | 251 | 232 |
| Ca content wt % | 9.01 | 8.40 |
| S content wt % | 3.32 | 2.31 |
| Equivalent ratio of metal addition | 3.3 | 2.8 |
| Solubility | soluble | — |
| Stability to moisture absorption hr | 36 | — |

EXAMPLE 3

The same experimental apparatus as that of Example 1 was used. 385.5 g (1.75 mol) of nonylphenol, 9.6 g (0.3 mol) of sulfur and 28.2 g (0.5 mol) of calcium oxide having a purity of 99.4% were charged thereinto and stirred under atmospheric pressure. To the resulting suspension, there was added 125.5 g (2.0 mol) of ethylene glycol at 115° C. under nitrogen pressure. The mixture was stirred at 115° C. under a pressure of 6.0 kg cm$^2$ and closed conditions for about 5 hours. While pressure within the reaction system was gradually reduced, water formed and part of ethylene glycol were distilled off to obtain 437.8 g of a distillation residue which was a dark yellowish green liquid. The temperature of the final distillate was 97° C. (18 mmHg).

Subsequently, carbon dioxide was allowed to be absorbed by 437.8 g of said distillation residue at a heating temperature of 125° C. from the reduced pressure state for 30 minutes. The final pressure as 4.2 kg/cm$^2$ Thereafter, the reaction system was pressurized to 6.0 kg/cm$^2$ with carbon dioxide. While the pressure was maintained, the reaction system was retained at 155° C. for 2 hours without deaeration to obtain 459.7 g of a reaction product solution. 404.7 g of the reaction product solution after the carbon dioxide treatment and 94.5 g of 150 neutral oil were put into a 1 liter two-necked pear shaped flask. A small amount of ethylene glycol, the greater part of unreacted nonylphenol and a small amount of the lubricating oil fraction were distilled off therefrom in a nitrogen stream under reduced pressure to obtain 184.2 g of a distillation residue. The temperature of the final distillate was 206° C. (4 mmHg). The distillation residue was filtered to remove very small amounts of insoluble matters, whereby 179.8 g of the final product was obtained which was a dense dark yellow clear liquid. The analysis showed that the active nonylphenol component accounted for 61.0 g of the total weight (179.8 g) of the final product. The properties of the final product are shown in Table 3.

COMPARATIVE EXAMPLE 3

The same experimental apparatus as that of Example 1 was used. 385.5 g (1.75 mol) of nonylphenol, 9.6 g (0.3 mol) of sulfur and 28.5 g (0.5 mol) of calcium oxide having a purity of 98.5% were charged thereinto and stirred under atmospheric pressure. To the resulting suspension, there was added 124.2 g (2.0 mol) of ethylene glycol at 130° C. in a nitrogen stream under atmospheric pressure. The mixture was stirred at 135° C. for about 5 hours. While pressure within the reaction system was gradually reduced, water formed and part of unreacted ethylene glycol were distilled off to obtain 432.0 g of a distillation residue which was a dark yellowish green liquid. The temperature of the final distillate was 78° C. (5 mmHg).

Subsequently, 428.5 g of said distillation residue was transferred to other autoclave. Pressure within the autoclave was reduced. Carbon dioxide was allowed to be absorbed by said distillation residue at a heating temperature of 125° C. from said reduced pressure state for 30 minutes. The final pressure was 4.2 kg cm². Thereafter, the reaction system was pressurized to 11.0 kg/cm² with carbon dioxide and then retained at 155° C. under closed conditions for 2 hours to obtain 447.1 g of a reaction product solution. 443.6 g of the reaction product solution after the carbon dioxide treatment and 119.7 g of 150 neutral oil were put into a 1 liter two-necked pear shaped flask. A small amount of ethylene glycol, most of unreacted nonylphenol and a small amount of the lubricating oil fraction were distilled off therefrom in a nitrogen stream under reduced pressure to obtain 238.4 g of a distillation residue. The temperature of the final distillate was 180° C. (5 mmHg). The distillation residue was filtered to remove very small amounts of insoluble matters, whereby there was obtained 235.2 g of the final product which was a dense dark yellow clear liquid. The analysis showed that the active nonyl phenol component accounted for 77.6 g of the total weight (235.2 g) of the final product. The properties of the final product are shown in Table 3.

It can be understood from Table 3 that the equivalent ratio of metal addition in Example 3 increases by about 15% in comparison with Comparative Example 3. Example 3 is an embodiment wherein a relatively large amount of ethylene glycol is reacted in comparison with the amount of the alkaline earth metal reagent.

TABLE 3

|  | Ex. 3 | Comp. Ex. 3 |
| --- | --- | --- |
| Properties of final product: |  |  |
| Viscosity cSt (@ 100° C.) | 448.4 | 143.8 |
| Basic number mg KOH/g | 262 | 220 |
| Ca content wt % | 9.26 | 7.80 |
| S content wt % | 3.52 | 2.30 |
| Equivalent ratio of metal addition | 3.0 | 2.6 |
| Solubility | soluble | — |
| Stability to moisture absorption hr | 24 | — |

EXAMPLE 4

The same experimental apparatus as that of Example 1 was used. 385.5 g (1.75 mol) of nonylphenol, 9.6 g (0.3 mol) of sulfur and 28.2 g (0.5 mol) of calcium oxide having a purity of 99.4% were charged thereinto and stirred under atmospheric pressure. To the resulting suspension, there was added 62.1 g (1.0 mol) of ethylene glycol at 165° C. under nitrogen pressure. The mixture was stirred at 165° C. under a pressure of 6.0 kg/cm² and closed conditions for about 3 hours, while pressure within the reaction system was gradually reduced, water formed and part of unreacted ethylene glycol were distilled off to obtain 439.3 g of a distillation residue which was a dark yellowish green liquid. The temperature of the final distillate was 97° C. (20 mmHg).

Subsequently, carbon dioxide was allowed to be absorbed by 439.3 g of said distillation residue at a heating temperature of 150° C. from the reduced pressure state for 30 minutes. The final pressure was 4.5 kg/cm². The reaction system was pressurized to 6.0 kg/cm² with carbon dioxide. While the pressure was maintained, the reaction system was retained at 178° C. for 2 hours without deaeration to obtain 458.9 g of a reaction product solution.

400.6 g of the reaction product solution after the carbon dioxide treatment and 92.2 of 150 neutral oil were put into a 1 liter two-necked pear shaped flask. A small amount of ethylene glycol, most of unreacted nonyl phenol and a small amount of the lubricating oil fraction were distilled off therefrom in a nitrogen stream under reduced pressure to obtain 181.2 g of a distillation residue. The temperature of the final distillate was 202° C. (4 mmHg). The distillation residue was filtered to remove very small amounts of insoluble matters, whereby 175.4 g of the final product was obtained which was a dense dark yellow clear liquid. The analysis showed that the active nonylphenol component accounted for 54.1 g of the total weight (175.4 g) of the final product.

COMPARATIVE EXAMPLE 4

The same experimental apparatus as that of Example 1 was used. 540.9 g (2.46 mol) of nonylphenol, 13.5 g (0.42 mol) of sulfur and 40.0 g (0.7 mol) of calcium oxide having a purity of 98.3% were charged into the apparatus and stirred under atmospheric pressure. To the resulting suspension, there was added 74.1 g (1.2 mol) of ethylene glycol at 165° C. in a nitrogen stream under atmospheric pressure. The mixture was stirred at 165° C. for about 5 hours. While pressure within the reaction system was reduced, water formed and part of unreacted ethylene glycol were distilled off to obtain 591.4 g of a distillation residue which was a dark yellowish green liquid. The temperature of the final distillate was 94° C. (7 mmHg).

Subsequently, carbon dioxide was allowed to be absorbed by 591.4 g of the distillation residue under the same conditions as those of Example 4. Thereafter, the reaction system was pressurized to 11.0 kg/cm² with carbon dioxide. The reaction system was retained at 178° C. for 2 hours under closed conditions to obtain 619.7 g of a reaction product solution. 611.9 g of the reaction product solution after the carbon dioxide treatment and 168.7 g of 150 neutral oil were put into a 1 liter two-necked pear shaped flask. A small amount of ethylene glycol, the greater part of unreacted nonylphenol and a small amount of the lubricating oil fraction were distilled off therefrom in a nitrogen stream under reduced pressure to obtain 412.3 g of a distillation residue. The distillation residue was filtered to remove very small amounts of insoluble matters, whereby 411.5 g of the final product was obtained. The analysis showed that the active nonylphenol component accounted for 136.4 g of the total weight (411.5 g) of the final product.

Example 4 is an embodiment wherein the addition of ethylene glycol and the metal addition-sulfurization reaction are carried out at a relatively high temperature.

TABLE 4

|  | Ex. 4 | Comp. Ex. 4 |
| --- | --- | --- |
| Properties of final product: |  |  |
| Viscosity cSt (@ 100° C.) | 375.8 | 218.1 |
| Basic number mg KOH/g | 262 | 186 |
| Ca content wt % | 9.25 | 6.63 |
| S content wt % | 3.45 | 2.24 |
| Equivalent ratio of metal addition | 3.3 | 2.2 |
| Solubility | soluble | — |
| Stability to mois- | 36 | — |

TABLE 4-continued

| | Ex. 4 | Comp. Ex. 4 |
| --- | --- | --- |
| ture absorption hr | | |

EXAMPLE 5

In this example, recovered alkylphenol containing the dihydric alcohol and mineral oil as the diluent was used as the starting material. 448.6 g of recovered nonylphenol (nonylphenol content being 1.7 mol) containing 1.5% of ethylene glycol and 13.6% of the lubricating oil fraction, 9.6 g (0.3 mol) of sulfur and 33.9 g (0.6 mol) of calcium oxide having a purity of 99.4% were charged into the apparatus and stirred. To the resulting suspension, there was added 66.0 g (1.1 mol) of ethylene glycol at 130° C. under nitrogen pressure. The mixture was stirred at 130° C. under a pressure of 6.0 kg/cm² and closed conditions for about 3 hours. While pressure within the reaction system was gradually reduced, water formed and part of unreacted ethylene glycol were distilled off to obtain 488.8 g of a distillation residue which was a dark yellowish green liquid. The temperature of the final distillate was 101° C. (22 mmHg).

Subsequently, carbon dioxide was allowed to be absorbed by 488.8 g of said distillation residue at a heating temperature of 150° C. from the reduced pressure state for 30 minutes. The final pressure was 3.9 kg/cm². Thereafter, the reaction system was pressurized to 6.0 kg/cm² with carbon dioxide. While the pressure was maintained, the reaction system was retained at 178° C. for 2 hours without deaeration to obtain 511.9 g of a reaction product solution which was dark yellowish green.

463.1 g of the reaction product solution after the carbon dioxide treatment and 62.0 g of 150 neutral oil were put into a 1 liter two-necked pear shaped flask. A small amount of ethylene glycol, the greater part of unreacted nonylphenol and a small amount of the lubricating oil fraction were distilled off in a nitrogen stream under reduced pressure to obtain 222.1 g of a distillation residue. The temperature of the final distillate was 198° C. (2 mmHg). The distillation residue was filtered to remove very small amount of insoluble matters, whereby 218.7 g of the final product was obtained which was a dense dark yellow clear liquid. The analysis showed that the active nonylphenol component accounted for 68.4 g of the total weight (218.7 g) of the final product. The properties of the final product are shown in Table 5.

COMPARATIVE EXAMPLE 5

The same recovered nonylphenol as that of recovered nonylphenol (nonyl phenol content being 2.1 mol), 9.6 g (0.3 mol) of sulfur and 34.3 g (0.6 mol) of calcium oxide having a purity of 98.3% were charged into the apparatus and stirred. To the resulting suspension, there was added 66.3 g (1.1 mol) of ethylene glycol at 130° C. in a nitrogen stream under atmospheric pressure. The mixture was stirred at 135° C. for about 4 hours. While pressure within the reaction system was gradually removed, water formed and part of unreacted ethylene glycol were distilled off to obtain 584.5 g of a distillation residue which was a dark yellowish green liquid. The temperature of the final distillate was 82° C. (5 mmHg).

Subsequently, carbon dioxide was allowed to be absorbed by 584.5 g of the distillation residue under the same condition as those of Example 5. The final pressure was 4.0 kg/cm². Thereafter, the reaction system was pressurized to 11.0 kg/cm² with carbon dioxide and retained at 178° C. under closed conditions for 2 hours to obtain 607.4 g of a reaction product solution.

530.6 g of the reaction product solution after the carbon dioxide treatment and 46.8 g of 150 neutral oil were put into a 1 ,liter two-necked pear shaped flask. A small amount of ethylene glycol, the greater part of unreacted nonylphenol and a small amount of the lubricating oil fraction were distilled off therefrom in a nitrogen stream under reduced pressure to obtain 243.7 g of a distillation residue. The temperature of the final distillate was 183° C. (5 mmHg). The distillation residue was filtered to remove very small amounts of insoluble matters, whereby 243.0 g of the final product was obtained. The analysis showed that the active nonylphenol component accounted for 97.2 g of the total weight (243.0 g) of the final product. The properties of the final product are shown in Table 5.

Example 5 is an embodiment wherein the recovered alkyl phenol is used as the starting material. The equivalent ratio of metal addition of Example 5 increases by about 50% in comparison with Comparative Example 5.

TABLE 5

| | Ex. 5 | Comp. Ex. 5 |
| --- | --- | --- |
| Properties of final product: | | |
| Viscosity cSt (@ 100° C.) | 244.4 | 225.6 |
| Basic number mg KOH/g | 266 | 218 |
| Ca content wt % | 9.39 | 8.00 |
| S content wt % | 3.04 | 3.13 |
| Equivalent ratio of metal addition | 3.3 | 2.2 |
| Solubility | soluble | — |
| Stability to moisture absorption hr | at least 48 | — |

EXAMPLE 6

In this example, dodecylphenol was used as the starting material. 667.9 g (2.55 mol) of dodecylphenol, 11.7 g (0.36 mol) of sulfur and 41.1 g (0.73 mol) of calcium oxide having a purity of 99.4% were charged into the apparatus and stirred. To the resulting suspension, there was added 90.4 g (1.45 mol) of ethylene glycol at 130° C. under nitrogen pressure. The mixture was stirred at 130° C. under a pressure of 6.0 kg/cm² and closed conditions for about 3 hours. While pressure within the reaction system was gradually reduced, water formed and part of unreacted ethylene glycol were distilled off to obtain 756.0 g of a distillation residue which was a dark yellowish green liquid. The temperature of the final distillate was 104° C. (24 mmHg).

Subsequently, carbon dioxide was allowed to be absorbed by 756.0 g of said distillation residue at a heating temperature of 150° C. from the reduced pressure state for 30 minutes. The final pressure was 4.2 kg/cm². Thereafter, the reaction system was pressurized to 6.0 kg/cm² with carbon dioxide. While the pressure was maintained, the reaction system was retained at 178° C. for 2 hours without deaeration to obtain 783.4 g of a reaction product solution which was dark yellowish green.

465.2 g of the reaction product solution after said carbon dioxide treatment and 92.6 g of 150 neutral oil were put into a 1 liter pear shaped flask. A small amount of ethylene glycol, most of unreacted dodecylphenol and a small amount of the lubricating oil fraction were distilled off therefrom in a nitrogen stream under reduced pressure to obtain 200.0 g of a distillation residue. The temperature of the final distillate was 202° C. (3 mmHg). The distillation residue was filtered to remove very small amounts of insoluble matters, whereby 194.2 g of the final product was obtained which was a dense dark yellow clear liquid. The analysis showed that the active dodecylphenol component accounted for 73.8 g of the total weight (194.2 g) of the final product. The properties of the final product are shown in Table 6.

EXAMPLE 7

In this example, dodecylphenol was used as the starting material, the amount of sulfur is reduced and the metal addition-sulfurization reaction was carried out at a relatively high pressure in comparison with Example 6. 471.6 g (1.8 mol) of dodecylphenol, 5.8 g (0.18 mol) of sulfur and 33.9 g (0.6 mol) of calcium oxide having a purity of 99.4% were charged into the apparatus and stirred. To the resulting suspension, there was added 74.5 g of ethylene glycol at 130° C. under nitrogen pressure. The mixture was stirred at 130° C. under a pressure of 11.0 kg/cm$^2$ and closed conditions for 3 hours. While pressure within the reaction system was gradually reduced, water formed and part of unreacted ethylene glycol were distilled off to obtain 531.0 g of a distillation residue which was a dark yellowish green liquid. The temperature of the final distillate was 89° C. (15 mmHg).

Subsequently, carbon dioxide was allowed to be absorbed by 531.0 g of said distillation residue from the reduced pressure state at a heating temperature of 150° C. for 30 minutes. The final pressure was 3.8 kg cm$^2$. Thereafter, the reaction system was pressurized to 6.0 kg/cm$^2$ with carbon dioxide. While the pressure was maintained, the reaction system was retained at 178° C. for 2 hours without deaeration to obtain 557.1 g of a reaction product solution which was dark yellowish green.

501.2 g of the reaction product solution after said carbon dioxide treatment and 114.2 g of 150 neutral oil were put into a 1 liter two-necked pear shaped flask. A small amount of ethylene glycol, most of unreacted dodecylphenol and a small amount of the lubricating oil fraction were distilled off therefrom in a nitrogen stream under reduced pressure to obtain 230.5 g of a distillation residue. The temperature of the final distillate was 194° C. (5 mmHg). The distillation residue was filtered to remove very small amounts of insoluble matters, whereby 226.8 g of the final product was obtained which was a dense dark yellow clear liquid. The analysis showed that the active dodecylphenol component accounted for 82.9 g of the total weight (226.8 g) of the final product. The properties of the final product are shown in Table 6.

COMPARATIVE EXAMPLE 6

In this Comparative Example 6, dodecylphenol was used as the starting material. 644.3 g (2.46 mol) of dodecylphenol, 11.3 g (0.35 mol) of sulfur and 40.0 g (0.7 mol) of calcium oxide having a purity of 98.5% were charged into the apparatus and stirred. To the resulting suspension, there was added 74.1 g of ethylene glycol at 130° C. in a nitrogen stream under atmospheric pressure. The mixture was stirred at 135° C. for about 4 hours. While pressure within the reaction system was gradually reduced, water formed and part of unreacted ethylene glycol were distilled off to obtain 702.6 g of a distillation residue which was a dark yellowish green liquid. The temperature of the final distillate was 112° C. (5 mmHg).

Subsequently, 697.0 g of the distillation residue was transferred to another autoclave. Pressure within the autoclave was reduced. Carbon dioxide was allowed to be absorbed by the distillation residue from the reduced pressure state at a heating temperature of 150° C. for 30 minutes. The final pressure was 4.3 kg/cm$^2$. Thereafter, the reaction system was pressurized to 6.0 kg cm$^2$ with carbon dioxide. While the pressure was maintained, the reaction system was retained at 178° C. for 2 hours without deaeration to obtain 726.7 g of a reaction product solution.

714.6 g of said reaction product solution after the carbon dioxide treatment and 151.2 g of 150 neutral oil were put into a 1 liter two-necked pear shaped flask. A small amount of ethylene glycol, the greater part of unreacted dodecylphenol and a small amount of the lubricating oil fraction were distilled off therefrom in a nitrogen stream under reduced pressure to obtain 351.5 g of a distillation residue. The distillation residue was filtered to remove very small amounts of insoluble matters, whereby 350.6 g of the final product was obtained. The analysis showed that the active dodecylphenol component accounted for 143.5 g of the total weight (350.6 g) of the final product. The properties of the final product are shown in Table 6.

TABLE 6

|  | Ex. 6 | Ex. 7 | Comp. Ex. 6 |
| --- | --- | --- | --- |
| Properties of final product: |  |  |  |
| Viscosity cSt (@ 100° C.) | 159.8 | 154.1 | 173.7 |
| Basic number mg KOH/g | 234 | 253 | 211 |
| Ca content wt % | 8.41 | 8.93 | 7.50 |
| S content wt % | 2.68 | 1.89 | 2.90 |
| Equivalent ratio of metal addition | 2.9 | 3.2 | 2.4 |
| Solubility | soluble | soluble | — |
| Stability to moisture absorption hr | at least 48 | 18 | — |

EXAMPLE 8

In this example, a mixture of the dihydric alcohol and water in the sulfurization-metal addition reaction stage was used in place of the dihydric alcohol alone. 331.0 g (1.5 mol) of nonylphenol, 11.3 g (0.35 mol) of sulfur and 28.3 g (0.5 mol) of calcium oxide having a purity of 99.2% were charged into the apparatus and stirred. To the resulting suspension, there was added a mixture of 37.4 g (0.6 mol) of ethylene glycol and 1.35 g of water at 130° C. under nitrogen pressure. The resulting mixture was stirred at 130° C. under closed conditions at a pressure of 8.0 kg/cm$^2$ for about 3 hours. While the pressure was gradually reduced, water added, water formed during the reaction and part of unreacted ethylene glycol were distilled off to obtain 395.3 g of a distillation residue which was a dark yellowish green liquid. The temperature of the final distillate was 105° C. (23 mmHg).

Subsequently, carbon dioxide was allowed to be absorbed by 395.3 g of the distillation residue from the reduced pressure state at a heating temperature of 150° C. for 30 minutes. The final pressure was 3.8 kg/cm$^2$. Thereafter, the reaction system was pressurized to 6.0 kg/cm$^2$ with carbon dioxide. While the pressure was maintained, the reaction system was retained at 178° C. for 2 hours without deaeration to obtain 417.7 g of a reaction product solution which was dark yellowish green.

378.4 g of the reaction product solution after said carbon dioxide treatment and 109.3 g of 150 neutral oil were put into a 1 liter two-necked pear shaped flask. A small amount of ethylene glycol, the greater part of unreacted nonylphenol and a small amount of the lubricating oil fraction were distilled off therefrom in a nitrogen stream under reduced pressure to obtain 209.5 g of a distillation residue. The temperature of the final distillate was 200° C. (3 mmHg). The distillation residue was filtered to remove very small amounts of insoluble matters, whereby 203.6 g of the final product was obtained which was a dense dark yellow clear liquid. The analysis showed that the active nonylphenol component accounted for 61.7 g of the total weight (203.6 g) of the final product. The properties of the final product are shown in Table 7.

COMPARATIVE EXAMPLE 7

The procedure of Example 8 was repeated except that the reaction in the metal addition-sulfurization reaction stages was carried out at a pressure of 2.0 kg/cm$^2$ under open conditions to prepare a basic alkaline earth metal phenate. After the sulfurization-metal addition reaction, water added, water formed during the reaction and part of unreacted ethylene glycol were distilled off to obtain 396.2 g of a liquid distillation residue. The temperature of the final distillate was 101° C. (20 mmHg). Subsequently, carbon dioxide was allowed to be absorbed by 396.2 g of the distillation residue from the reduced pressure state at a heating temperature of 150° C. for 30 minutes. The final pressure was 4.0 kg/cm$^2$. Thereafter, the reaction system was pressurized to 6.0 kg/cm$^2$ with carbon dioxide. While the pressure was maintained, the reaction system was retained at 178° C. for 2 hours without deaeration to obtain 416.5 g of a reaction product solution which was dark yellowish green. A small amount of ethylene glycol, the greater part of unreacted nonylphenol and a small amount of lubricating oil fraction were distilled out from a mixture of 368.1 g of said reaction product solution and 106.7 g of 150 neutral oil to obtain 225.6 g of a distillation residue. The temperature of the final distillate was 182° C. (5 mmHg). The yield of the final product was 221.3 g. The analysis showed that the active nonylphenol component accounted for 73.0 g of the total weight (221.3 g) of the final product. The properties of the final product are shown in Table 7.

EXAMPLE 9

In this example, calcium hydroxide was used as the starting alkaline earth metal reagent. 275.4 g (1.25 mol) of nonylphenol, 8.0 g (0.25 mol) of sulfur and 40.5 g (0.50 mol) of calcium hydroxide having a purity of 91.4% were charged into the apparatus and stirred. To the resulting suspension, there was added 62.1 g (1.0 mol) of ethylene glycol at 130° C. under nitrogen pressure. The mixture was stirred at 130° C. under a pressure of 6.0 kg/cm$^2$ and closed conditions for about 3 hours. While the reaction system was gradually reduced, water formed during the reaction and part of ethylene glycol were distilled off to obtain 317.6 g of a distillation residue which was a dark yellowish green liquid. The temperature of the final distillate was 102° C. (19 mmHg).

Subsequently, carbon dioxide was allowed to be absorbed by 317.6 g of the distillation residue from the reduced pressure state at a heating temperature of 150° C. for 30 minutes. The final pressure was 3.8 kg/cm$^2$ Thereafter, the reaction system was pressurized to 6.0 kg cm$^2$ with carbon dioxide. While the pressure was maintained, the reaction system was retained at 178° C. for 2 hours without deaeration to obtain 334.3 g of a reaction product solution which was dark yellowish green.

280.3 g of the reaction product solution after the carbon dioxide treatment and 102.2 g of 150 neutral oil were put into a 1 liter two-necked pear shaped flask. A relatively small amount of ethylene glycol, substantially all of unreacted nonylphenol and a relatively small amount of the lubricating oil fraction were distilled off therefrom in a nitrogen stream under reduced pressure to obtain 185.5 g of a distillation residue. The temperature of the final distillate was 198° C. (4 mmHg). The distillation residue was filtered to remove very small amounts of insoluble matters, whereby 182.5 g of the final product was obtained which was a dense dark yellow clear liquid. The analysis showed that the active nonylphenol component accounted for 54.8 g of the total weight (182.5 g) of the final product. The properties of the final product are shown in Table 7.

TABLE 7

| | Ex. 8 | Ex. 9 | Comp. Ex. 7 |
|---|---|---|---|
| Properties of final product: | | | |
| Viscosity cSt (@ 100° C.) | 171.7 | 92.1 | 110.1 |
| Basic number mg KOH/g | 242 | 220 | 215 |
| Ca content wt % | 8.54 | 7.92 | 7.50 |
| S content wt % | 3.34 | 2.72 | 3.12 |
| Equivalent ratio of metal addition | 3.1 | 2.9 | 2.5 |
| Solubility | soluble | soluble | — |
| Stability to moisture absorption hr | 20 | at least 48 | — |

EXAMPLE 10

The same experimental apparatus as that of Example 1 was used. 440.6 g (2.0 mol) of nonylphenol, and 22.6 g (0.4 mol) of calcium oxide having a purity of 99.2% were charged into the apparatus and stirred under atmospheric pressure. To the resulting suspension, there was added 49.7 g (0.8 mol) of ethylene glycol at 130° C. under nitrogen pressure. The mixture was stirred at 130° C. under a pressure of 6.0 kg/cm$^2$ and closed conditions for about 3 hours. While pressure within the reaction system was gradually reduced, water formed and part of unreacted ethylene glycol were distilled off to obtain 478.4 g of a distillation residue which was a dark green liquid. The temperature of the final distillate was 104° C. (20 mmHg).

Subsequently, 6.4 g (0.2 mol) of sulfur was added to 478.4 g of said distillation residue. Carbon dioxide was allowed to be absorbed by the mixture from the reduced pressure state at a heating temperature of 150° C. for 30 minutes. The final pressure was 4.6 kg cm$^2$. Thereafter, the reaction system was pressurized to 6.0 kg/cm$^2$ with carbon dioxide. While the pressure was maintained, the reaction system was retained at 178° C. for 2 hours without deaeration to obtain 499.5 g of a reaction product solution.

437.9 g of the reaction product solution after said carbon dioxide treatment and 84.6 g of 150 neutral oil were put into a 1 liter two-necked pear shaped flask. A small amount of ethylene glycol, the greater part of unreacted nonylphenol and a small amount of the lubricating oil fraction were distilled off therefrom in a nitrogen stream under reduced pressure to obtain 150.0 g of a distillation residue. The temperature of the final distillate was 204° C. (3 mmHg). The distillation residue was filtered to remove very small amounts of insoluble matters, whereby 148.0 g of the final product was obtained which was a dense dark yellow clear liquid. The analysis showed that the active nonylphenol component accounted for 49.8 g of the total weight (148.0 g) of the final product. The properties of the final product are shown in Table 8.

EXAMPLE 11

The same experimental apparatus as that of Example 1 was used. 276.3 g (1.25 mol) of nonylphenol, and 28.3 g (0.5 mol) of calcium oxide having a purity of 39.4% were charged into the apparatus and stirred under atmospheric pressure. To the resulting suspension, there was added 62.6 g (1.0 mol) of ethylene glycol at 130° C. under nitrogen pressure. The mixture was stirred at 130° C. under a pressure of 6.0 kg cm$^2$ and closed conditions for about 3 hours. While pressure within the reaction system was gradually reduced, water formed and part of ethylene glycol were distilled off to obtain 313.5 g of a distillation residue which was a dark green liquid. The temperature of the final distillate was 105° C. (14 mmHg).

Subsequently, 8.0 g (0.25 mol) of sulfur was added to 313.5 g of said distillation residue. Carbon dioxide was allowed to be absorbed by the mixture from the reduced pressure state at a heating temperature of 150° C. for 30 minutes. The final pressure was 4.2 kg cm$^2$. Thereafter, the reaction system was pressurized to 6.0 kg/cm$^2$ with carbon dioxide. While the pressure was maintained, the reaction system was retained at 178° C. for 2 hours without deaeration to obtain 337.4 g of a reaction product solution.

297.8 g of the reaction product solution after the carbon dioxide treatment and 94.3 g of 150 neutral oil were put into a 1 liter two-necked pear shaped flask. A small amount of ethylene glycol, the greater part of unreacted nonylphenol and a small amount of the lubricating oil fraction were distilled off therefrom in a nitrogen stream under reduced pressure to obtain 183.3 g of a distillation residue. The temperature of the final distillate was 197° C. (2 mmHg). The distillation residue was filtered to remove very small amounts of insoluble matters, whereby 179.3 g of the final product was obtained which was a dense dark yellow clear liquid. The analysis showed that the active nonylphenol component accounted for 51.3 g of the total weight (179.3 g) of the final product. The properties of the final product are shown in Table 8.

EXAMPLE 12

The same experimental apparatus as that of Example 1 was used. 254.2 g (1.15 mol) of nonylphenol, and 26.1 g (0.46 mol) of calcium oxide having a purity of 99.4% were charged into the apparatus and stirred under atmospheric pressure. To the resulting suspension, there was added 57.6 g (0.93 mol) of ethylene glycol at 130° C. under nitrogen pressure. The mixture was stirred at 130° C. under a pressure of 6.0 kg cm$^2$ and closed conditions for about 3 hours. While pressure within the reaction system was gradually reduced, water formed and part of unreacted ethylene glycol were distilled off to obtain 288.4 g of a distillation residue which was a dark green liquid. The temperature of the final distillate was 105° C. (14 mmHg).

Subsequently, 11.1 g (0.35 mol) of sulfur was added to 288.4 g of said distillation residue. Carbon dioxide was allowed to be absorbed by the mixture from the reduced pressure state at a heating temperature of 150° C. for 30 minutes. The final pressure was 4.0 kg cm$^2$. Thereafter, the reaction system was pressurized to 6.0 kg/cm$^2$ with carbon dioxide. While the pressure was maintained, the reaction system was retained at 8° C. for 2 hours without deaeration to obtain 312.8 g of a reaction product solution.

265.6 g of the reaction product solution after the carbon dioxide treatment and 83.4 g of 150 neutral oil were put into a 1 liter two-necked pear shaped flask. A small amount of ethylene glycol, the greater part of unreacted nonylphenol and a small amount of the lubricating oil fraction were distilled off therefrom in a nitrogen stream under reduced pressure to obtain 164.7 g of a distillation residue. The temperature of the final distillate was 200° C. (3 mmHg). The distillation residue was filtered to remove very small amounts of insoluble matters, whereby 161.7 g of the final product was obtained which was a dense dark yellow clear liquid. The analysis showed that the active nonylphenol component accounted for 47.8 g of the total weight (161.7 g) of the final product. The properties of the final product are shown in Table 8.

EXAMPLE 13

The same experimental apparatus as that of Example 1 was used. 385.8 g (1.75 mol) of nonylphenol, and 56.8 g (0.7 mol) of calcium hydroxide having a purity of 91.4% were charged into the apparatus and stirred under atmospheric pressure. To the resulting suspension, there was added 87.1 g (1.4 mol) of ethylene glycol at 130° C. under nitrogen pressure. The mixture was stirred at 130° C. under a pressure of 6.0 kg/cm$^2$ and closed conditions for about 3 hours. While pressure within the reaction system was gradually reduced, water formed and part of unreacted ethylene glycol were distilled off to obtain 443.0 g of a distillation residue which was a dark green liquid. The temperature of the final distillate was 105° C. (15 mmHg).

Subsequently, 11.2 g (0.35 mol) of sulfur was added to 443.0 g of said distillation residue. Carbon dioxide was allowed to be absorbed by the mixture from the reduced pressure state at a heating temperature of 150° C. for 30 minutes. The final pressure was 4.7 kg/cm$^2$. Thereafter, the reaction system was pressurized to 6.0 kg cm$^2$ with carbon dioxide. While the pressure was maintained, the reaction system was retained at 178° C. for 2 hours without deaeration to obtain 475.8 g of a reaction product solution.

427.9 g of the reaction product solution after the carbon dioxide treatment and 112.8 g of 150 neutral oil were put into a 1 liter two-necked pear shaped flask. A small amount of ethylene glycol, the greater part of unreacted nonylphenol and a small amount of the lubricating oil fraction were distilled off therefrom in a nitrogen stream under reduced pressure to obtain 242.6 g of a distillation residue. The temperature of the final distillate was 185° C. (3 mmHg). The distillation residue was filtered to remove very small amounts of insoluble matters, whereby 238.0 g of the final product was obtained which was a dense dark yellow clear liquid. The analysis showed that the active nonylphenol component accounted for 79.1 g of the total weight (238.0 g) of the final product. The properties of the final product are shown in Table 8.

Examples 10 to 13 are embodiments wherein the addition of sulfur is made in the carbon dioxide treatment stage, and sulfurization and carbon dioxide treatment are simultaneously carried out.

TABLE 8

| | Ex. 10 | Ex. 11 | Ex. 12 | Ex. 13 |
|---|---|---|---|---|
| Properties of final product: | | | | |
| Viscosity cSt (@ 100° C.) | 184.7 | 155.9 | 235.8 | 116.5 |
| Basic number mg KOH/g | 257 | 263 | 260 | 256 |
| Ca content wt % | 9.17 | 9.36 | 9.13 | 9.06 |
| S content wt % | 2.57 | 2.82 | 3.55 | 2.76 |
| Equivalent ratio of metal addition | 3.0 | 3.6 | 3.4 | 3.0 |
| Solubility | soluble | soluble | soluble | soluble |
| Stability to moisture absorption hr | at least 48 | 24 | at least 48 | at least 48 |

COMPARATIVE EXAMPLE 8

The same experimental apparatus as that of Example 1 was used. 385.6 g (1.75 mol) of nonylphenol, 11.3 g (0.35 mol) of sulfur and 39.5 g of (0.7 mol) of calcium oxide having a purity of 99.4% was charged into the apparatus and stirred under atmospheric pressure. To the resulting suspension, there was added 156.5 g (2.5 mol) of ethylene glycol at 130° C. in a nitrogen stream under atmospheric pressure. The mixture was stirred at 135° C. for about 5 hours. While pressure within the reaction system was gradually reduced, water formed and part of unreacted ethylene glycol were distilled off to obtain 526.9 g of a distillation residue which was a dark yellowish green liquid. The temperature of the final distillate was 101° C. (14 mmHg).

Subsequently, carbon dioxide was allowed to be absorbed by 526.9 g of said distillation residue from the reduced pressure state at a heating temperature of 125° C. for 30 minutes. The final pressure was 4.1 kg/cm$^2$. Thereafter, the reaction system was pressurized to 9.0 kg/cm$^2$ with carbon dioxide. While the pressure was maintained, the reaction system was retained at 155° C. for 2 hours without deaeration to obtain 564.3 g of a reaction product solution which was dark yellowish green. 480.5 g of said reaction product solution after the carbon dioxide treatment and 104.1 g of 150 neutral oil were put into a 1 liter two-necked pear shaped flask. A small amount of ethylene glycol, most of unreacted nonylphenol and a small amount of the lubricating oil fraction were distilled off therefrom in a nitrogen stream under reduced pressure to obtain 255.5 g of a distillation residue. The temperature of the final distillate was 183° C. (4 mmHg). The distillation residue was filtered to remove very small amounts of insoluble matters, whereby 250.1 g of the final product was obtained which was a dense dark yellow clear liquid. The analysis showed that the active nonylphenol component accounted for 80.2 g of the total weight (250.1 g) of the final product. The properties of the final product are shown in Table 9.

COMPARATIVE EXAMPLE 9

The same experimental apparatus as that of Example 1 was used. 539.7 g (2.45 mol) of nonylphenol, 4.5 g (0.14 mol) of sulfur and 39.9 g (0.7 mol) of calcium oxide having a purity of 98.5% were charged into the apparatus and stirred under the atmospheric pressure. To the resulting suspension, there was added 86.9 g (1.4 mol) of ethylene glycol at 130° C in a nitrogen stream under atmospheric pressure. The mixture was stirred at 135° C. for about 5 hours. While pressure within the reaction system was gradually reduced, water formed and part of ethylene glycol were distilled off to obtain 652.9 g of a distillation residue which was a dark yellowish green liquid. The temperature of the final distillate was 99° C. (16 mmHg).

Subsequently, carbon dioxide was allowed to be absorbed by 652.9 g of said distillation residue from the reduced pressure state at a heating temperature of 125° C. for 30 minutes. The final pressure was 4.2 kg/cm$^2$. Thereafter, the reaction system was pressurized to 9.0 kg/cm$^2$ with carbon dioxide. While the pressure was maintained, the reaction system was retained at 155° C. for 2 hours without deaeration to obtain 675.3 g of a reaction product solution which was dark yellowish green. 512.4 g of said reaction product solution after the carbon dioxide treatment and 172.0 g of 150 neutral oil were put into a 1 liter two-necked pear shaped flask. A small amount of ethylene glycol, most of unreacted nonylphenol and a small amount of the lubricating oil fraction were distilled of therefrom in a nitrogen stream under reduced pressure of obtain 237.5 g of a distillation residue. The temperature of the final distillate was 192° C. (5 mmHg). The distillation residue was filtered to remove very small amounts of insoluble matters, whereby 232.6 g of the final product was obtained which was a dense dark yellow clear liquid. The analysis showed that the active nonylphenol component accounted for 74.3 g of the total weight (232.6 g) of the final product. The properties of the final product are shown in Table 9.

Comparative Examples 8 and 9 are embodiments wherein the sulfurization-metal addition reaction is carried out under atmospheric pressure and open conditions. In Table 9, tests on stability to moisture absorption could not be carried out, because the final products were insoluble in the Middle Eastern paraffinic 50 engine oil.

TABLE 9

| | Comp. Ex. 8 | Comp. Ex. 9 |
|---|---|---|
| Properties of final product: | | |
| Viscosity cSt (@ 100° C.) | 352.4 | 184.7 |
| Basic number mg KOH/g | 249 | 241 |
| Ca content wt % | 9.04 | 8.71 |
| S content wt % | 3.17 | 1.44 |
| Equivalent ratio of metal addition | 3.1 | 3.0 |
| Solubility | insoluble | insoluble |
| Stability to moisture absorption hr | — | — |

It will be understood from the above-described examples that over-based phenate type detergents can be obtained by simple means according to the present invention which are excellent in oil solubility and stability and in which a relatively large excess of an alkaline earth metal per phenol is added.

While the invention has been described in detail and with reference to specific embodiments thereof, it will be apparent to one skilled in the art that various changes and modifications can be made therein without departing from the spirit and scope thereof.

What is claimed is:

1. A process for producing an over-based sulfurized alkaline earth phenate type detergent, which comprises reacting a phenol and a dihydric alcohol with an alkaline earth metal reagent which is an alkaline earth metal oxide or hydroxide to carry out an addition reaction of the alkaline earth metal provided by the alkaline earth metal reagent to the phenol in a reaction system, reacting sulfur therewith to carry out a sulfurization reaction and then reacting carbon dioxide therewith to carry out a carbon dioxide treatment, wherein said metal addition reaction and said sulfurization reaction are carried out under pressure and closed conditions without allowing gaseous material to escape from the reaction system during said metal addition reaction and said sulfurization reaction.

2. A process as in claim 1, which comprises reacting a phenol, a dihydric alcohol, an alkaline earth metal reagent and sulfur to carry out simultaneously metal addition and sulfurization and then carrying out the carbon dioxide treatment.

3. A process as in claim 1, which comprises reacting a phenol and a dihydric alcohol with an alkaline earth metal reagent to carry out the addition of the metal to the phenol and then adding sulfur thereto to carry out simultaneously sulfurization and carbon dioxide treatment, wherein the metal addition is carried out under pressure and closed conditions, and the sulfurization and the carbon dioxide treatment are carried out under pressure without deaeration.

4. A process as in claim 1, wherein said phenol is a phenol having a hydrocarbon side chain having 4 to 36 carbon atoms.

5. A process as in claim 1, wherein said phenol is a phenol which is a liquid at a temperature of 120° C. or higher.

6. A process as in claim 1, wherein said alkaline earth metal reagent is calcium oxide, calcium hydroxide, barium oxide, barium hydroxide, strontium oxide, strontium hydroxide, magnesium oxide, or magnesium hydroxide.

7. A process as claimed in claim 1, wherein the amount of the alkaline earth metal reagent to be used is from 0.01 to 0.99 equivalents per one equivalent of the phenol.

8. A process as in claim 1, wherein said dihydric alcohol is ethylene glycol or propylene glycol.

9. A process as in claim 1, wherein the amount of the dihydric alcohol to be used is from 0.15 to 6 mol per mol of the alkaline earth metal reagent.

10. A process as in claim 1, wherein the reaction in the metal addition reaction stage is carried out by adding water to the reaction system.

11. A process as in claim 1, wherein the reaction in the metal addition-sulfurization reaction stage is carried out by adding water to the reaction system.

12. A process as in claim 11, wherein the amount of water to be added is from 0.01 to 2.0 mol per mol of the alkaline earth metal reagent.

13. A process as in claim 3, wherein the reaction in the metal addition reaction stage is carried out by adding water to the reaction system.

14. A process as in claim 13, wherein the amount of water to be added is from 0.01 to 2.0 mol per mol of the alkaline earth metal reagent.

15. A process as in claim 1, wherein the amount of sulfur to be added is not more than 4.0 mol per mol of the alkaline earth metal reagent.

16. A process as in claim 1, wherein the metal addition reaction and the sulfurization reaction are carried out in the presence of a diluent.

17. A process as in claim 2, wherein the metal addition-sulfurization reaction is carried out in the presence of a diluent.

18. A process as in claim 17, wherein said diluent is a petroleum fraction.

19. A process as in claim 3, wherein the metal addition reaction is carried out in the presence of a diluent.

20. A process as in claim 19, wherein said diluent is a petroleum fraction.

21. A process as in claim 1, wherein the metal addition reaction and the sulfurization reaction are carried out at a temperature of 60° to 200° C. under a pressure of 2 to 11 kg/cm$^2$ and closed conditions.

22. A process as i claim 1, wherein the sulfurization reaction and the carbon dioxide treatment are carried out at a temperature of 50° to 230° C. under a pressure of 2 to 11 kg/cm$^2$ and closed conditions.

23. A process as in claim 2, wherein the metal addition-sulfurization reaction stage is carried out at a temperature of 60° to 200° C. under a pressure of 2 to 11 kg/cm$^2$ and closed conditions.

24. A process as in claim 2, wherein the metal addition-sulfurization reaction stage is carried out at a temperature of 90° to 190° C. under a pressure of 2 to 6 kg/cm$^2$ and closed conditions.

25. A process as in claim 3, wherein the metal addition reaction stage is carried out at a temperature of 60° to 200° C. under a pressure of 2 to 11 kg cm$^2$ and closed conditions.

26. A process as in claim 3, wherein the metal addition reaction stage is carried out at a temperature of 90° to 190° C. under a pressure of 2 to 6 kg cm$^2$ and closed conditions.

27. A process as in claim 2, wherein at least 30% of water added in the step of the metal addition-sulfurization reaction and water formed during that reaction stage is distilled off.

28. A process as in claim 3, wherein at least 30% of water added in the step of the metal addition-sulfurization reaction and water formed during that reaction stage is distilled off.

29. A process as in claim 1, wherein the carbon dioxide treatment stage is carried out at a temperature of 50° to 230° C. under pressure without deaeration.

30. A process as claimed in claim 2, wherein the carbon dioxide treatment stage is carried out at a temperature of 50° to 230° C. under pressure without deaeration.

31. A process as in claim 3, wherein the sulfurization-carbon dioxide treatment stage is carried out at a temperature of 50° to 230° C. under a pressure of 2 to 11 kg cm$^2$ and closed conditions.

32. A process as in claim 1, wherein the unreacted phenol contained in the reaction product after the carbon dioxide treatment is recovered and used as the starting material.

33. A process as in claim 1, wherein a surplus of the dihydric alcohol from the metal addition reaction stage is recovered before or after the carbon dioxide treatment.

34. A process as in claim 1, wherein insoluble matters are removed from the reaction product after the carbon dioxide treatment.

* * * * *